United States Patent [19]

Coyne

[11] Patent Number: 4,467,253

[45] Date of Patent: Aug. 21, 1984

[54] DIFFERENTIAL SIGNAL DECODER

[75] Inventor: David Coyne, Glenrothes, Scotland

[73] Assignee: Burroughs Corporation, Detroit, Mich.

[21] Appl. No.: 337,208

[22] Filed: Jan. 5, 1982

[30] Foreign Application Priority Data

Jan. 6, 1981 [GB] United Kingdom ................ 8100253

[51] Int. Cl.³ ............................................ G05B 21/02
[52] U.S. Cl. .................................. 318/636; 318/662; 318/602; 318/663
[58] Field of Search ............... 318/636, 662, 602, 663

[56] References Cited

U.S. PATENT DOCUMENTS

| | | | |
|---|---|---|---|
| 3,098,957 | 7/1963 | Thompson et al. | 318/636 X |
| 3,675,135 | 7/1972 | Weller | 318/636 X |
| 4,266,168 | 5/1981 | Andersen | 318/636 X |
| 4,270,077 | 5/1981 | Swartz et al. | 318/636 X |
| 4,334,179 | 6/1982 | Grimes et al. | 318/636 X |
| 4,357,566 | 11/1982 | Du Vall | 318/636 |
| 4,371,921 | 2/1983 | Cushman | 318/636 X |

*Primary Examiner*—B. Dobeck
*Attorney, Agent, or Firm*—David G. Rasmussen; Kevin R. Peterson; Edmund M. Chung

[57] ABSTRACT

A decoder decodes and accurately scales so-called "tribit" servo signals after the receipt of only one tribit pattern without the use of A.G.C. by storing the peak values of the position indicating pulses the capacitors in first and second peak-and-hold circuits and thereafter discharging both capacitors with the same time constant, activating a sample-and-hold circuit to hold the value of the output of a difference amplifier at the instant when the output of a summing amplifier falls below a predetermined value.

30 Claims, 17 Drawing Figures

DIFFERENTIAL SIGNAL DECODER

BACKGROUND TO THE INVENTION

1. Field of the Invention

The present invention relates to a self-scaling decoder for differential signals.

Whilst the invention is hereinafter described with reference to decoding signals indicative of the radially displacement of a transducer from being centrally disposed over a servo track on a disc in a disc data store, it is to be understood that this does not constitute a restriction in its use.

2. The Prior Art

It is well known to convey information by means of differential signals. Such signals consist of two components. The difference between the two components is usually the property of the signals it is desired to extract. In those cases where the difference is indicative of some measurement, it is also desirable that the difference be according to some predetermined scale. It is known that, in order that the difference between two equally scaled quantities be to a predetermined scale, the sum of the two quantities must equal some predetermined value irrespectively of their individual, instantaneous values.

To this end, it is well known to subject the two components to a common amplification process wherein an automatic level control is imposed such that the sum of the two components is equal to a predetermined level. The sum of the two amplified components is substrated from the predetermined level and the result of that subtraction used as the gain controlling signal in an automatic gain control loop.

In the case of the decoding of a servo signal recovered from a servo track on a rotating disc, a transducer picks up the servo signal which is presented as the input to a signal amplifier. The output of the signal amplifier is provided as the input to a resolver which resolves the signal into two position indicating components, the difference therebetween being indicative of the magnitude and sense of the displacement of the transducer from being centrally disposed over the servo track. The difference between the components is provided as an output, while the two components are summed in a summing amplifier. The output of the summing amplifier is provided as the subtractive input to a difference amplifier whose additive input is a predetermined fixed level. The output of the difference amplifier is coupled back to the signal amplifier as a gain controlling input. In this way the resolver provides its outputs according to a predetermined scaling factor.

The stability requirement in the feedback loop of an automatic gain control amplifier, especially one of high gain and bandwidth, such as might be used for amplifying the signals recovered from a transducer in a disc data store, is such that the bandwidth of the loop itself is kept very small. The signal must therefore be present in the amplifier for a considerable time before the output level reaches its stabilised value.

It is the trend that a servo track, in a disc data store, instead of consisting of a repeated plurality of transducer position indicating patterns recorded continuously around the disc, as was previously the case, now consists of relatively few, isolated patterns recorded among data signals and designed to provide a decoded output indicative of the radial position of that data, for use as a position feedback to a transducer positioner.

One isolated pattern, such as might be found among the data, is insufficient to stabilise an automatic gain control loop, and therefore cannot provide an accurately scaled output when used as the input to the type of decoder already known in the art. Uncertainty of scale makes for difficulties in using the decoded servo signal as a feedback signal for the transducer positioner, since the gain and phase margins of the positioning loop so obtained are rendered uncertain. If an automatic gain control loop is so used, an additional problem arises in that the low bandwidth of the loop introduces additional, unwanted poles and zeros into the positioning loop response. These problems are accentuated by the differences in recovered amplitude encountered by a transducer when recovering signals from different radii on the disc.

It is therefore desirable to provide a decoder capable of providing an accurately scaled output from an isolated servo pattern recorded on a disc without the introduction of low frequency poles.

SUMMARY OF THE INVENTION

The present invention consists in a decoder for providing the difference between first and second signals comprising; a first sampler for taking a sample of said first signal, a second sampler for taking a sample of said second signal, and a scaler for taking proportional parts of said first and second sampled signals in equal measure and for providing an output representative of the difference between said proportional parts when the sum of said proportional parts equals a predetermined value.

BRIEF DESCRIPTION OF THE PREFERRED EMBODIMENT

In a preferred embodiment a first sample-and-hold circuit samples the first signal and a second sample-and-hold circuit samples the second signal, storing their samples on first and second capacitors respectively. A difference amplifier preferably has as inputs, the voltages on the first and second capacitors and provides, as an output, the difference there-between. A summing amplifier preferably has the voltages on the first and second capacitors as its inputs and provides, as its output, their sum, which output is provided as a first input to a comparator whose other input is a fixed, predetermined level. Indication is preferably provided as to the completion of the taking of said first and second samples. The indication of the completion of taking said first and second samples is preferably provided as an activating input to a discharger operable in response thereto to discharge said first and second capacitors with the same time constant. The output of the comparator is preferably coupled as the activating input to a third sample-and-hold circuit which responds to the output of the comparator being indicative of the output of the summing amplifier falling below the predetermined level by sampling and holding the output of the difference amplifier which sample is provided as the output of the decoder.

The first and second signals are preferably the resolved components of a servo signal of the so-called "Tribit" variety as described in U.S. Pat. No. 3,691,543, recovered by a magnetic transducer from a rotating magnetic disc, in which case the indication of the completion of sampling is provided when both of the position indicating peaks have been sampled, the first and second signals being the amplitudes of the first and second position indicating peaks respectively.

The invention is further described, by way of an example, by the following description in conjunction with the appended drawings, in which:

DETAILED DESCRIPTION OF THE PREFERRED EMBODIMENT

Figure 1:
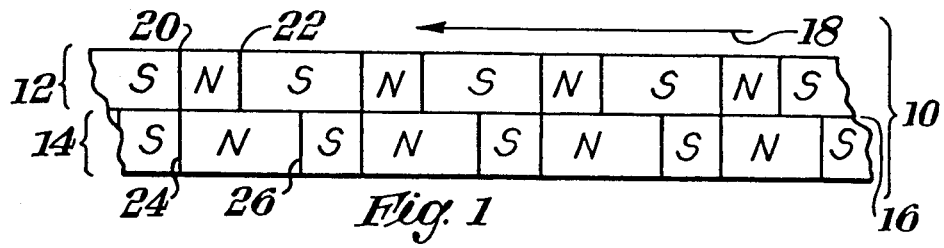
FIG. 1 shows a tribit track magnetisation pattern.

FIG. 1 shows a portion of a circular tribit track concentrically recorded on a rotating magnetic disc.

The tribit track 10 comprises a first sub-track 12 and a second sub-track 14 recorded contiguously the common boundary being a central line 16. Each of the sub-tracks 12,14 comprises areas of a first magnetisation N sequentially recorded with areas of a second magnetisation S. The track moves as indicated by the arrow 18 as a result of the rotation of the disc. The first sub-track 12 has S-N boundaries 20 and N-S boundaries 22. The second sub-track also has S-N boundaries 24 and N-S boundaries 26. The S-N boundaries 20 of the first sub-track 12 and the S-N boundaries 24 of the second sub-track 14 are aligned to form common S-N boundaries stretching across the whole track 10. The N-S boundaries 22 of the first sub-track and the N-S boundaries 26 of the second sub-track 14 are staggered such that the N-S boundaries 22 of the first sub-track 12 pass any point befroe the N-S boundaries of the second sub-track 14.

Figure 2A:
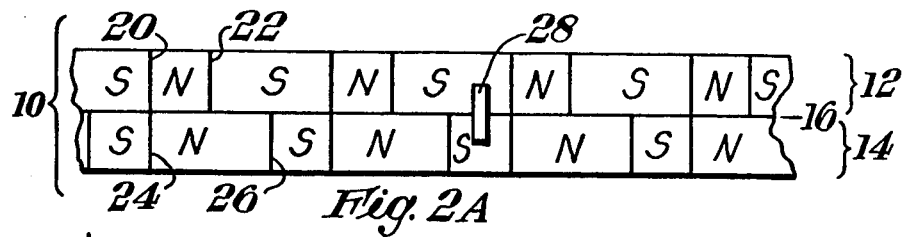
FIG. 2A shows a head centrally disposed over the tribit track.
Figure 2B:
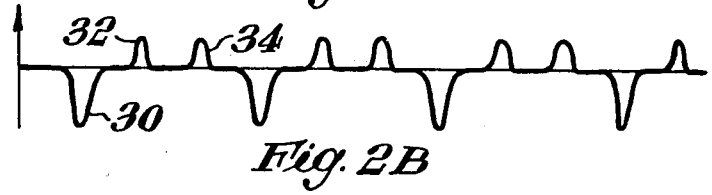
FIG. 2B shows the waveform obtained from the head of FIG. 2A.

FIG. 2A shows a magnetic head 28 centrally disposed over the track 10 and FIG. 2B shows the waveform that the head 28 recovers from the track 10.

The head 28 comprises a gap for picking up magnetic flux which lies transversely to the motion of the track 10 and extends for a width less than or equal to the width of the sub-tracks 12, 14. Whenever a S-N boundary 20, 24 passes beneath the head 28, the head 28 produces, as output, a negative pulse. Whenever a N-S boundary 22, 26 passes beneath the head 28 the head 28 produces, as output, a positive pulse. The amplitude of any output pulse is proportional to the proportion of the width of the head 28 that the boundary producing the pulse traverses.

The head 28 is centrally disposed, that is, is equally placed over the central line 16. As the common S-N boundary 20, 24 passes beneath the head 28, it straddles the entire width of the head, and produces a negative, timing pulse 30 of maximum amplitude. When the N-S boundary 22 of the first sub-track 12 passes beneath the head 28 it straddles only half the width of the head 28 and produces a first position indicating pulse 32 which is positive and whose amplitude is half that of the timing pulse 32. Similarly, when the N-S boundary 26 of the second sub-track 14 passes beneath the head 28 it too straddles only half the width of the head and produces a second position indicating pulse 34 which is also positive and which also has an amplitude equal to half of the amplitude of the timing pulse 30. The centrally disposed position is indicated by the first position indicating pulse 32 and the second position indicating pulse 34 having the same amplitudes.

Figure 2C:
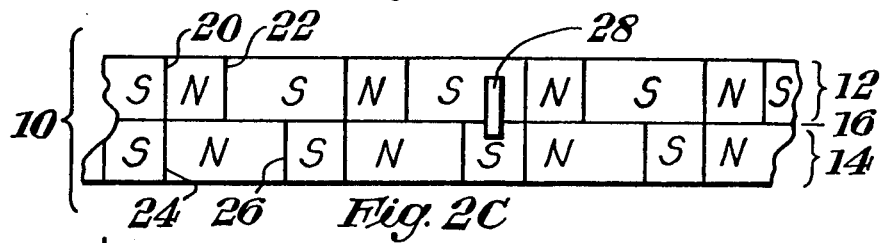
FIG. 2C shows a head disposed non-centrally to a first side of the tribit track.
Figure 2D:
FIG. 2D shows the waveform obtained from the head of FIG. 2C.

FIG. 2C shows the head 28 disposed to lie more over the first sub-track 12 than over the second sub-track 14, and FIG. 2D shows the waveform recovered by the head 28 therefrom.

The timing pulse 30 is still of the same maximum amplitude since the common S-N boundary 20, 24 still extends across the entire width of the head 28. The N-S boundary 22 of the first sub-track 12 extends across a greater proportion of the width of the head 28 than does the N-S boundary 26 of the second sub-track 14. Accordingly, the first position indicating pulse 32 has a greater amplitude than does the second position indicating pulse 34. In the limiting case, when the head 28 is entirely over the first sub-track 12, the second position indicating pulse 34 has zero amplitude and the first position indicating pulse 32 has an amplitude equal to that of the timing pulse 30.

Figure 2E:
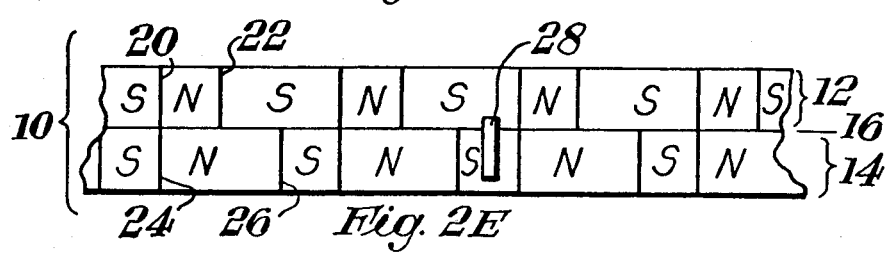
FIG. 2E shows a head non-centrally disposed to a second side of the tribit track.
Figure 2F:
FIG. 2F shows the waveform obtained from the head of FIG. 2E.

FIG. 2E shows the head 28 disposed more over the second sub-track 14 than over the first sub-track 12, and FIG. 2F shows the waveform the head 28 derives therefrom.

The common S-N boundary 20, 24 still extends across the entire width of the head 28 and the timing pulse 20 is accordingly still at the same, maximum amplitude. The N-S boundary 26 of the second sub-track 14 extends across a greater proportion of the width of the head 28 than does the N-S boundary 22 of the first sub-track 12. Accordingly the amplitude of the second position indicating pulse 34 is greater than the amplitude of the first position indicating pulse 32. In the limiting case where the head 28 is entirely over the second sub-track 14 the amplitude of the first position indicating pulse 32 is zero and the amplitude of the second position indicating pulse 34 is equal to the amplitude of the timing pulse 30.

The displacement of the head 28 from being centrally disposed about the central line 16 is therefore calculable as a function of the width of the head and the relative amplitudes of the first and second position indicating pulses 32, 34. It is to be noted that the sum of the amplitudes of the first and second position indicating pulses 32, 34 is always equal to the amplitude of the timing pulse 30, indpendently of the displacement.

If the width of the head 28 is W, the amplitude of the first position indicating pulse 32 is A and the amplitude of the second position indicating pulse 34 is B, then the displacement D of the head 28 from central disposition is given by:

$$D = W(A-B)/(A+B)$$

It is seen that if the quantity (A+B) is made equal to a predetermined value, then a decoder which gives as its ouput the difference between the amplitudes of the first and second position indicating pulses 32, 34 will give an output which, by sign and magnitude, is a linear function of the displacement, such as might be obtained from a normal position indicating transducer suitable for use as the feedback element in a head positioning servomechanism.

Figure 3:
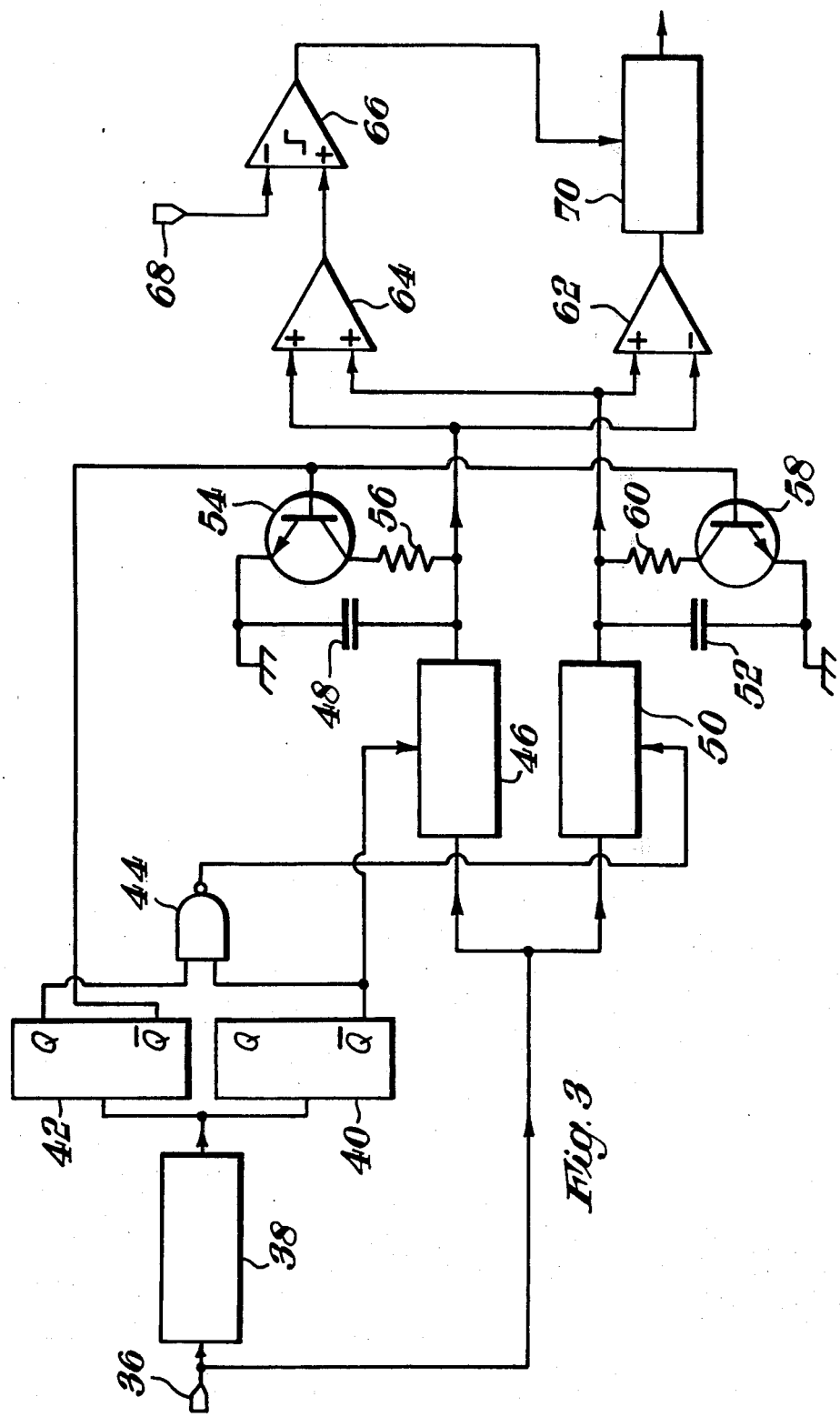
FIG. 3 shows, schematically, the decoder.

FIG. 3 shows a schematic of the decoder and FIGS. 4A to 4I show voltage waveforms associated therewith, each to the same time scale.

Figure 4A:
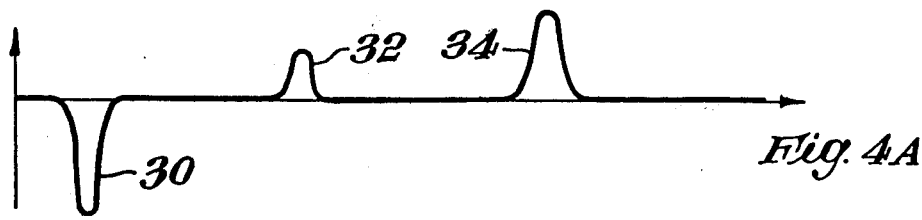
FIGS. 4A to 4I show waveforms associated with FIG. 3.
Figure 4B:
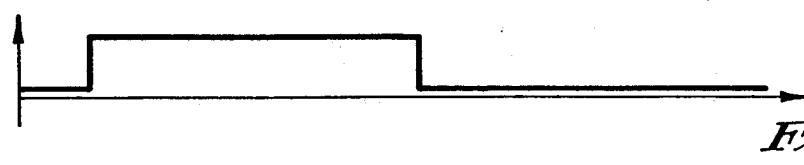
Figure 4C:
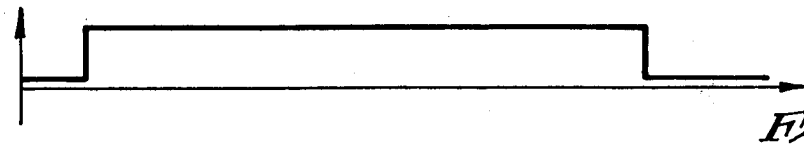

The signal, recovered from the disc by the head 28, and shown in FIG. 4A, is presented to the decoder via the head coupling 36. The head coupling 36 provides the input to a negative peak detector 38 which produces an output indicative of and coincident with the timing pulse 30. The output of the negative peak detector 38 is provided as the initiating input to a first one-shot timer 40 and a second one-shot timer 42. The second timer 42 has a longer period than does the first timer 40. The output of the first timer is shown in FIG. 4B and of the second timer in FIG. 4C. Each of the timers 40, 42 produces a Q output which is true during the timing operation of the timer 40, 42, and otherwise false, and a $\bar{Q}$ output which is false during the timing operation and otherwise true. A NAND gate 44 is coupled to the $\bar{Q}$ output of the first timer and the Q output of the second timer to provide an output which is logically true except when the second timer 42 is operational but the first timer 40 has completed its timeout. This period, during which the output of the NAND gate 44 is logically false, coincides with the presentation of the second position indicating pulse on the head coupling 36. The period when the first timer 40 is operational coincides with the presentation of the first position indicating pulse on the head coupling 36. The instant of cessation of operation of the second timer 42 is indicative of the completion of the introduction, on the head coupling 36, of a complete set of timing 30 and position pulses 32, 34.

The head coupling 36 also provides the input to a first peak-and-hold circuit 46. The first peak-and-hold circuit 46 is controlled by the $\bar{Q}$ output of the first timer 40 such that the circuit 46 is operational only when the $\bar{Q}$ output of the first timer 40 is false, that is, while the first timer 40 is executing its timeout and the first position peak 32 is being presented. The first peak-and-hold circuit 46 stores the peak value of the first position-indicating peak 32 as a voltage on a first capacitor 48.

The head coupling 36 further provides the input to a second peak-and-hold circuit 50, controlled by the output of the NAND date 44 so as to be operational only during the time of presentation of the second position-indicating peak 34 to store the peak value of the second timing peak 34 as a voltage on a second capacitor 52.

Figure 4D:
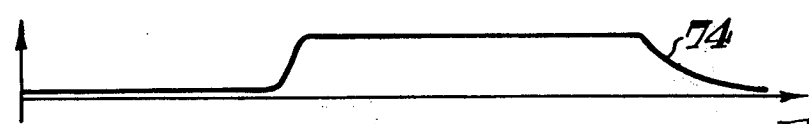
Figure 4E:
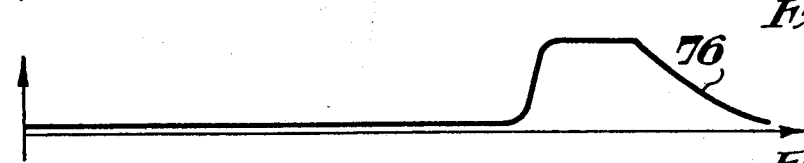

FIG. 4D shows the voltage on the first capacitor 48 and FIG. 4E shows the voltage on the second capacitor 52.

A first transistor 54 is connected so as to discharge the first capacitor 48 through a first resistor 56 and a second transistor 58 is connected so as to discharge the second capacitor 52 through a second resistor 60. The bases of the transistors 54, 58 are coupled to the $\bar{Q}$ output of the second timer 42 so that the transistors 54, 58 are turned off while the second timer 42 is operational and the capacitors 48, 52 are not discharged, and turned on when the second timer is not operational so that the capacitors 48, 52 are discharged. Thus, when the timing pulse 30 starts the first and second timers 40, 42 via the negative peak detector 38, the transistors cease discharging the capacitors 48 and thereby allow them to hold the peak values of the first and second position indicating pulses 32, 34 respectively from the first and second peak-and-hold circuits 46, 50 respectively.

At the end of the operation of the second timer 42 the transistors 54, 58 once again become conductive and discharge the capacitors 48, 25. It is arranged that the time constant of the combination of the first capacitor 48 with the first resistor 56 is the same as the time constant of the combination of the second capacitor 52 with the second resistor 60. The capacitors 48, 52 therefore discharge with the same exponential time constant falling by equal proportions in equal times. The discharging voltages 74, 76 of the capacitors 48, 52 are thus equally proportional falling values of the initial peak value of the first position indicating pulse 32 and the second position indicating pulse 34.

Figure 4F:
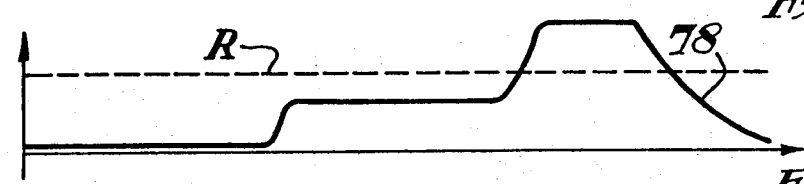
Figure 4G:
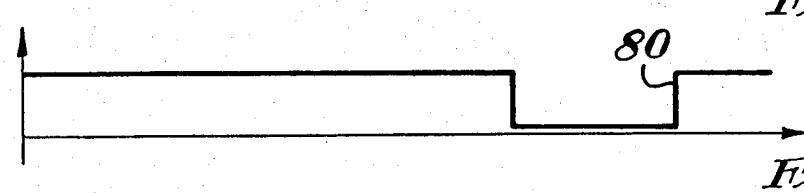
Figure 4H:
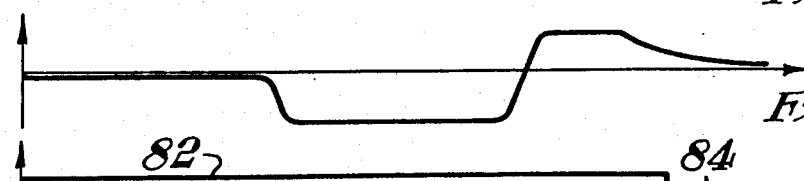

The voltages of the capacitors 48, 52 are coupled as the inputs to a difference amplifier 62 whose output is the instantaneous difference between the voltage of the first capacitor 48 and the voltage on the second capacitor 52. The output of the difference amplifier 62 is shown in FIG. 4H. The voltages on the first and second capacitors 48, 52 are also provided as the input to a summing amplifier 64 whose output is the sum of the two capacitor voltages and is shown in FIG. 4F. The summing amplifier 64 output voltage has an exponentially falling section 78 resulting from the discharging action of the transistors 54, 58 at the termination of the operation of the second timer 42. The output of the summing amplifier 64 is provided as the negative input to a voltage comparator 66, whose positive input is provided via the reference coupling 66 and is a positive reference voltage R represented in FIG. 4F by dotted line. Whenever the positive input of the comparator 66 is more positive than the negative input signal, the output of the comparator is logically true, and logically false when this is not the case. The output of the comparator is shown in FIG. 4G. It is seen that its output possesses a rising edge 80 as the output of the summing amplifier 64 falls back through the reference level R as the transistors 54, 58 discharge the capacitors 48, 52.

Figure 4I:

The output of the comparator 66 is coupled as the triggering input to a sample-and-hold circuit 70 whose signal input is the output of the difference amplifier 62. The sample-and-hold circuit 70 responds to the rising edge 80 of the output of the comparator 66 by acquiring and retraining the value presented to its signal input at the instant of occurrence of the rising edge 80, and presenting that value as its output. The output of the sample-and-hold circuit is shown in FIG. 4I. The output changes from whatever retained value it had beforehand 82 to the value of the output of the difference amplifier 84 at the instant that the rising edge 80 occurs on the output of the comparator 66.

The decoder is thus able, in the above manner, to provide an accurately scaled output representation of the difference between the amplitudes of the first and second position indicating pulses 32, 34 on the receipt of just one complete servo pattern, and in a time insignificantly longer than the duration of the pattern.

If the decoder is to be used for repeated patterns it is to be appreciated that the discharge of the capacitors 48, 52 must be accomplished before the receipt of a further timing pulse 30.

It will be apparent to those skilled in the art that the present invention may be applied to any form of differential signal where the difference between incoming signals requires to be accurately scaled. It will further be apparent that the sampling and decay process may equally well be accomplished using inductive circuits, or by supplying numerical representations of the input signals to a processor which, by arithmetical simulation may present an output representative of the scaled difference.

I claim:

1. A decoder for providing an output signal representative of the scaled difference between first and second input signals, said decoder comprising:

first sampling means, coupled to receive said first input signal and to receive a first command signal, said first sampler being operable in response to the receipt of said first command signal to provide, as output, a first sampled signal representative of said first input signal;

second sampling means, coupled to receive said second input signal and to receive a second command signal, said second sampler being operable in response to the receipt of said second command signal to provide, as output, a second sampled signal representative of said second input signal;

scaling means, coupled to receive said first and second sampled signals and to receive a third command signal, said scaler being operable in response to the receipt of said third command signal to reduce said first and second sampled signals by the same changing fraction to provide as output a varying first scaled signal representative of said first sampled signal reduced by said same fraction and a varying second scaled signal representative of said second sampled signal reduced by said same fraction;

third sampling means, coupled to receive said first and second scaled signals as input, operable to calculate the sum of and the difference between said first and second scaled signals, and further operable to provide, as the output of said decoder, a decoder output signal representative of said difference between said first and second scaled signals whenever said sum of said first and second scaled signals is equal to a predetermined value; and control means, coupled to provide in turn said first command signal to said first sampling means, to provide said second command signal to said second sampling means, and to provide said third command signal to said scaling means.

2. A decoder according to claim 1 wherein said scaling means comprises:

a first scaling circuit comprising a first capacitor coupled to receive said first sampled signal and a first discharge circuit, coupled to said first capacitor and coupled to receive said third command signal, said first discharge circuit being operable, in response to the receipt of said third command signal, to discharge said first capacitor with a predetermined time constant;

a second scaling circuit comprising a second capacitor coupled to receive said second sampled signal and a second discharge circuit coupled to said second capacitor and coupled to receive said third command signal, said second discharge circuit being operable in response to the receipt of said third command signal to discharge said second capacitor with said predetermined time constant, whereby, the signal on said first capacitor becomes said first scaled signal and the signal on said second capacitor becomes said second scaled signal by virtue of said signals on said first and second capacitors being simultaneously discharged with said same, predetermined time constant.

3. A decoder according to claim 2 wherein said third sampling means comprises:

a summing amplifier, coupled to receive said first scaled signal as a first input, coupled to receive said second scaled signal as a second input, and operable to provide an output representative of said sum of said first and second scaled signals;

a difference amplifier, coupled to receive said first scaled signal as a first input, coupled to receive said second scaled signal as a second input and operable to provide an output representative of said difference between said first and second scaled signals;

a comparator, coupled to receive said output of said summing amplifier as a first input, coupled to receive said predetermined level as a second input, and operable to provide output indicative of said output of said summing amplifier being equal to said predetermined level; and a sample-and-hold circuit, coupled to receive said output of said difference amplifier as a first input, coupled to receive said output of said comparator as a second input, and operable, in response to the receipt of said output from said comparator, to sample and hold the instantaneous value of said output of said difference amplifier for provision as said output signal of said decoder.

4. A decoder according to claim 3 wherein said first sampling means comprises a first peak-and-hold circuit operable to provide, as said first sampled signal, the peak value of said first input signal during the application of said first command signal, and wherein said second sampling means comprises a second peak-and-hold circuit operable to provide, as said second sampled signal, the peak value of said second input signal during the application of said second command signal.

5. A decoder according to claim 4 wherein said first and second input signals are collectively representative of the position of a transducer relative to a datum on a moving medium.

6. A decoder according to claim 5 wherein said moving medium is a rotary magnetic disc, wherein said datum is a servotrack recorded on said disc, and wherein said transducer is a magnetic head.

7. A decoder according to claim 6 wherein said servotrack comprises one or more patterns.

8. A decoder according to claim 7 wherein said output of said decoder is for use as a feedback signal in a servomechanism.

9. A decoder according to claim 8 wherein said servomechanism is operative to position said transducer relative to said medium.

10. A decoder according to claim 1, further comprising resolving means, coupled to receive a composite input signal representative of both said first and second input signals and operable, in response to said composite input signal, to resolve said composite input signal to provide, as a first output, said first input signal and to provide, as a second output, said second input signal.

11. A decoder according to claim 10, wherein said scaling means comprises:

a first scaling circuit comprising a first capacitor coupled to receive said first sampled signal and a first discharge circuit, coupled to said first capacitor and coupled to receive said third command signal, said first discharge circuit being operable, in response to the receipt of said third command signal, to discharge said first capacitor with a predetermined time constant;

a second scaling circuit comprising a second capacitor coupled to receive said second sampled signal and a second discharge circuit coupled to said second capacitor and coupled to receive said third command signal, said second discharge circuit being operable in response to the receipt of said third command signal to discharge said second capacitor with said predetermined time constant, whereby, the signal on said first capacitor becomes said first scaled signal and the signal on said second capacitor becomes said second scaled signal by virtue of said signals on said first and second capacitors being simultaneously discharged with said same, predetermined time constant.

12. A decoder according to claim 11, wherein said third sampling means comprises:

a summing amplifier, coupled to receive said first scaled signal as a first input, coupled to receive said second scaled signal as a second input, and operable to provide an output representative of said sum of said first and second scaled signals;

a difference amplifier, coupled to receive said first scaled signal as a first input, coupled to receive said second scaled signal as a second input and operable to provide an output representative of said difference between said first and second scaled signals;

a comparator, coupled to receive said output of said summing amplifier as a first input, coupled to receive said predetermined level as a second input, and operable to provide output indicative of said output of said summing amplifier being equal to said predetermined level; and a sample-and-hold circuit, coupled to receive said output of said difference amplifier as a first input, coupled to receive said output of said comparator as a second input, and operable, in response to the receipt of said output from said comparator, to sample and hold the instantaneous value of said output of said difference amplifier for provision as said output signal of said decoder.

13. A decoder according to claim 12, wherein said first sampling means comprises a first peak-and-hold circuit operable to provide, as said first sampled signal, the peak value of said first input signal during the application of said first command signal, and wherein said second sampling means comprises a second peak-and-hold circuit operable to provide, as said second sampled signal, the peak value of said second input signal during the application of said second command signal.

14. A decoder according to claim 11, wherein said first sampling means comprises a first peak-and-hold circuit operable to provide, as said first sampled signal, the peak value of said first input signal during the application of said first command signal, and wherein said second sampling means comprises a second peak-and-hold circuit operable to provide, as said second sampled signal, the peak value of said second input signal during the application of said second command signal.

15. A decoder according to claim 13, wherein said composite input signal is a servo signal recovered by a transducer from a moving medium, representative of the position of said transducer relative to a datum on said moving medium.

16. A decoder according to claim 13, wherein said moving medium is a rotary magnetic disc, wherein said datum is a servotrack recorded on said disc, and wherein said transducer is a magnetic head.

17. A decoder according to claim 16, wherein said servotrack comprises one or more patterns.

18. A decoder according to claim 17, wherein said output of said decoder is for use as a feedback signal in a servomechanism.

19. A decoder according to claim 18, wherein said servomechanism is operative to position said transducer relative to said medium.

20. A decoder according to claim 14, wherein said composite input signal is a servo signal recovered by a transducer from a moving medium, representative of the position of said transducer relative to a datum on said moving medium.

21. A decoder according to claim 20, wherein said moving medium is a rotary magnetic disc, wherein said datum is a servotrack recorded on said disc, and wherein said transducer is a magnetic head.

22. A decoder according to claim 21, wherein said servotrack comprises one or more patterns.

23. A decoder according to claim 22, wherein said output of said decoder is for use as a feedback signal in a servomechanism.

24. A decoder according to claim 23, wherein said servomechanism is operative to position said transducer relative to said medium.

25. A decoder according to claim 1, wherein said first sampling means comprises a first peak-and-hold circuit operable to provide, as said first sampled signal, the peak value of said first input signal during the application of said first command signal, and wherein said second sampling means comprises a second peak-and-hold circuit operable to provide, as said second sampled signal, the peak value of said second input signal during the application of said second command signal.

26. A decoder according to claim 25, wherein said first and second input signals are collective representative of the position of a transducer relative to a datum on a moving medium.

27. A decoder according to claim 26, wherein said moving medium is a rotary magnetic disc, wherein said datum is a servotrack recorded on said disc, and wherein said transducer is a magnetic head.

28. A decoder according to claim 27, wherein said servotrack comprises one or more patterns.

29. A decoder according to claim 28, wherein said output of said decoder is for use as a feedback signal in a servomechanism.

30. A decoder according to claim 29, wherein said servomechanism is operative to position said transducer relative to said medium.

* * * * *

UNITED STATES PATENT AND TRADEMARK OFFICE
CERTIFICATE OF CORRECTION

PATENT NO. : 4,467,253
DATED : August 21, 1984
INVENTOR(S) : David Coyne

It is certified that error appears in the above-identified patent and that said Letters Patent is hereby corrected as shown below:

Column 10, Claim 26, line 51, delete "collective" and insert --collectively--.

Signed and Sealed this

Twentieth Day of August 1985

[SEAL]

Attest:

DONALD J. QUIGG

Attesting Officer     Acting Commissioner of Patents and Trademarks